March 13, 1962 F. W. DWYER ETAL 3,024,655
FILTER GAUGE
Filed June 16, 1959
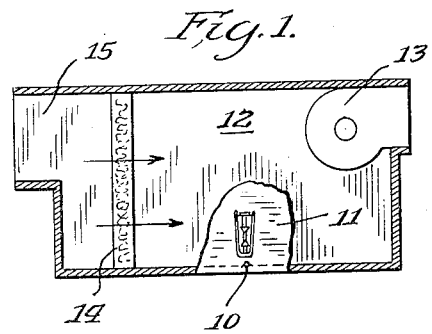
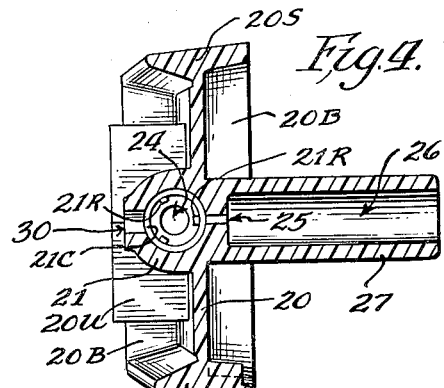
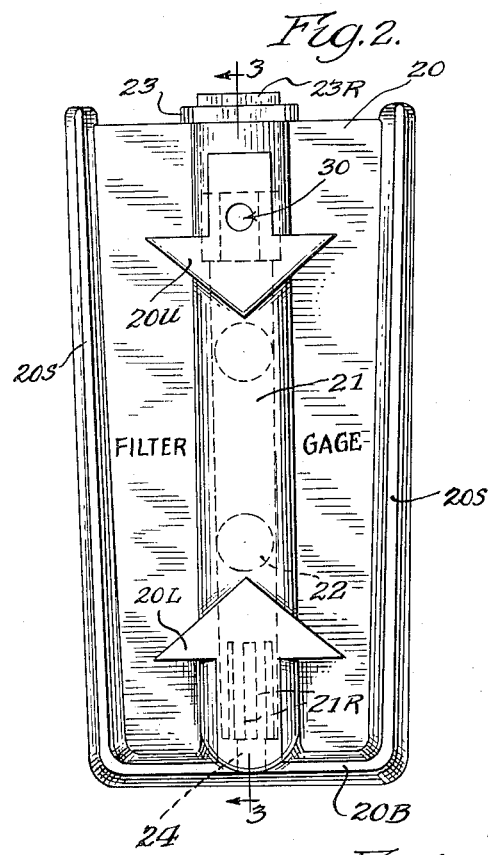
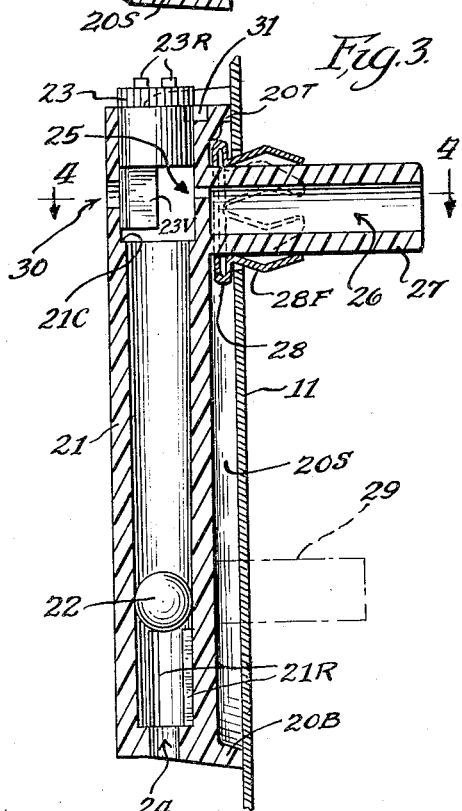
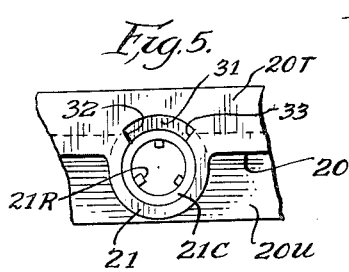
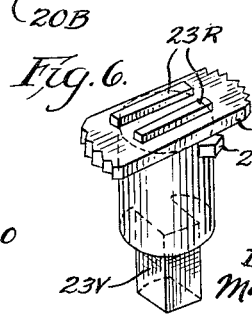
Inventors
Frank W. Dwyer and
John P. Locke
By Mann, Brown & McWilliams
Attys.

United States Patent Office 3,024,655
Patented Mar. 13, 1962

3,024,655
FILTER GAUGE
Frank W. Dwyer, Oak Park, Ill., and John P. Locke, Michigan City, Ind., assignors to F. W. Dwyer Mfg. Company, a corporation of Illinois
Filed June 16, 1959, Ser. No. 820,811
2 Claims. (Cl. 73—209)

This invention relates to a gauge for indicating the condition of a filter used in air-handling systems such as are found in forced warm air furnaces, summer-winter air conditioners, unit air conditioners, window air conditioners, and the like. More particularly, the invention is concerned with a filter gauge accurately responsive to small static pressure differences and also conveniently adjustable to adapt a single gauge construction for use with a variety of different systems.

The performance of many air-handling systems which include air filters is critically related to the condition of the air filter, both in terms of system balance and in terms of system output. The average user of such systems is familiar with the fact that the filter must be periodically cleaned and/or replaced but is totally unfamiliar with the frequently critical relationships which exist between the condition of the filter and the performance of the system.

Thus a genuine need exists for a reliable filter gauge that: eliminates guesswork in the servicing of filters; is simple to install and operate and conveniently adjustable to the conditions in each particular system with which it is associated; and is long-lived and low-cost.

It is the principal object of the present invention to provide a low-cost mass-production filter gauge that satisfies this need, that is rugged and long-lived, and that produces a stable, accurate indication of changes in the air flow conditions of the system in which it is connected.

Basically this is accomplished by providing a filter gauge comprised of a body of molded transparent plastic material having a vertically positioned float tube, the upper end of which communicates with the plenum chamber at the suction side of the air-circulating fan of the system and the lower end of which is exposed to atmosphere with a bypass being provided at the upper end of the float tube and adjustably controllable to adapt the filter gauge to the requirements of the air-handling system. The bypass arrangement controls the flow of air from atmosphere to the plenum chamber for initially regulating the level of the float when the filter is clean. Even though the absolute pressure at the clean filter condition may vary widely for the different systems involved, this form of adjustment permits the present filter gauge to respond more uniformly if the plenum chambers with which it is associated undergo corresponding pressure differentials in changing from a clean filter condition to a dirty filter condition. This more uniform response permits versatile application of the filter gauge of this invention with reliability and accuracy.

Other objects and advantages will become apparent during the course of the following description.

In the accompanying drawings forming a part of this specification and in which like numerals are employed to designate like parts throughout the same:

FIG. 1 is a diagrammatic view illustrating a preferred mounting application of the filter gauge of this invention to a conventional air-handling system;

FIG. 2 is a front elevational view of a preferred constructional embodiment of the filter gauge of this invention;

FIG. 3 is a vertical sectional view taken on the line 3—3 of FIG. 2 and illustrating the gauge mounted on a vertical wall;

FIG. 4 is a horizontal sectional view taken on the line 4—4 of FIG. 3;

FIG. 5 is a fragmentary top plan view illustrating the construction of the filter gauge body at the open upper end of the float tube; and FIG. 6 is an enlarged perspective view of a control plug for mounting in the top end of the float tube and adjustable for controlling the bypass flow resistance of the gauge.

Referring now to the drawings and particularly to FIG. 1, the gauge of this invention, as indicated generally at 10, is shown mounted on a vertical wall 11 that encloses a plenum chamber 12 of a simplified form of air-handling system. The system includes a fan or blower 13 which draws air into the plenum chamber 12 through a filter 14 that separates an air-intake passage 15 and the plenum chamber. This basic arrangement typifies the majority of air conditioning installations such as are found in summer-winter air conditioners, unit air conditioners, and window air conditioners. The arrangement may also represent a portion of a forced warm air furnace system, though in such instances the duct work of the return air system introduces a measure of resistance into the flow system.

As will become clear, the gauge of this invention does not measure the actual static pressure differential existing on opposite sides of the filter 14, but rather, in the interest of a simplified mounting arrangement, the gauge is connected between the plenum chamber 12 which is at the suction side of the blower unit 13 and the atmosphere. In a window air conditioner the upstream side of the filter is exposed to the pressure conditions of the room so that a true pressure differential is measured; however, in a forced warm air furnace system, the flow resistance offered by the return air duct work introduces a certain pressure differential between atmosphere and the upstream side of the filter. To illustrate, a static pressure reading in the blower compartment of a window air conditioner might be on the order of —.10″ water whereas, due to the pressured drop of the duct work, a static pressure reading in the blower compartment of a warm air furnace system might be on the order of —.20″ water, although in each case the pressure drop across the filter is identical. In accordance with the present invention, an adjustable bypass arrangement permits the same gauge to function reliably in either system.

The filter gauge 10 comprises a transparent molded plastic body that is formed to include a transparent float tube 21, a float 22, and a plug valve 23 mounted in the top of the float tube. The gauge body is preferably molded of acrylic plastic and has a planar main vertical wall 20 interrupted intermediately to incorporate the float tube and provided with marginal reinforcement flanges 20T, 20B, and 20S along its top, bottom and side edges, respectively. The top flange 20T at its front end terminates flush with the main wall 20, while the remaining flanges project both forwardly and rearwardly of the main wall. The body preferably includes arrowhead-shaped integral bosses 20U and 20L, respectively, projecting forwardly from the front face of the main wall 20 to designate the upper and lower range markers for the float.

The float tube 21 forms an upwardly diverging tapered bore that is open at its opposite ends. At its bottom end the float tube is formed with three circumferentially spaced internal ribs 21R which co-operably form a float seat that supports the float at an elevated position in the bore to avoid sticking of the float. Adjacent its upper end the tube is formed with a circular internal shoulder 21C, and the portion of the bore extending upwardly from this shoulder is of straight, cylindrical form for receiving the cylindrical body of the control plug 23 in snug, sealing engagement. The inlet orifice 24 of the float tube opens through a transverse bottom flange 20B, and the outlet orifice 25 of the float tube, in the preferred constructional embodiment illustrated herein for purposes of disclosure, opens radially rearwardly through the float tube wall and communicates with an outlet passage 26 provided in an integral tubular mounting stud 27.

As shown in FIG. 3, the gauge is applied to the vertical wall 11 bordering the plenum chamber 12 of FIG. 1 by first drilling a hole, of ⅜" diameter, by way of example, then mounting a tubular rod clamp 28 into the wall opening, the clamp being of the type having a circular arrangement of integral resilient gripping fingers 28F, and thereafter forcing the mounting stud 27 into the clamp until the rearwardly extending body flanges 20T, 20B and 20S abut the mounting wall.

The body flanges extend a sufficient distance rearwardly of the float tube to provide mounting clearance for the head of the rod clamp and the flanges are preferably coplanar and provide substantially air-tight engagement against the mounting wall to prevent an air-leakage path from atmosphere to the plenum chamber through the spaces existing around the mounting stud. It is, of course, important that the gauge be mounted in a vertical position, and if desired, the float tube may be provided with an integral auxiliary mounting stud, as indicated in phantom at 29, for locating engagement within another suitably located hole that would be drilled in the mounting wall at a suitable position. It will also be apparent that the mounting connection for the gauge need not in all instances be associated with its outlet passage though this is the preferred form.

It will now be apparent that with the gauge mounted on a wall bordering the plenum chamber 12 of an air-handling system so that its inlet orifice 24 is exposed to atmosphere and so that its outlet orifice 25 communicates with the plenum chamber, the rate of flow of air through the float tube is proportional to the static pressure differential. As the filter 14 becomes clogged, the static pressure differential increases and the flow rate through the float tube increases to raise the float ball and indicate the dirty condition of the filter.

While the illustrated arrangement is preferred for its simplicity of mounting, it is contemplated that the inlet orifice could, if desired, be connected through a suitable tubing arrangement to sense the static pressure directly at the upstream side of the filter.

In accordance with the present invention, the float tube 21 is provided with a wall opening 30 at a point above the normal travel of the float 22 to form a bypass, and the plug valve 23 is rotatable in the top end of the tube to control flow through the bypass passage and correspondingly to regulate flow through the float tube itself. This construction gives the gauge a versatility that permits its application to a wide variety of air-handling systems and is particularly important because over its range of adjustment the gauge of the present invention achieves a more uniform response than has heretofore been obtained in gauges of this nature. As illustrated, the bypass opening 30 is preferably substantially directly opposite the outlet orifice and the plug valve 23 includes a depending valve stem 23V shiftable upon rotation of the plug valve to fully or only partially close the bypass opening, as desired. It will also be noted that the valve stem limits upward travel of the float 22. In order to control the mounting position of the plug valve, the top flange 20T of the plastic body is formed with an arcuate slot 31 (see FIG. 5) bordering the bore of the float tube and the plug valve includes a radially projecting stop 23S movable arcuately in the slot between a fully open abutment shoulder 32 and a fully closed abutment shoulder 33 bordering opposite ends of the slot 31. This arrangement precludes the possibility of the valve stem being associated with the outlet orifice 25, and this is important since the more uniform response characteristic of the gauge would be lost were range adjustments to be made by varying the flow condition of the outlet orifice. To facilitate turning of the valve plug, spaced apart parallel ridges 23R are formed on its head for engagement by a screwdriver.

The gauge construction of this invention may be applied by the individual user simply by mounting it on the plenum chamber wall 11 to dispose the float tube in a vertical position; and thereafter, with a clean filter in place in the system, the control plug is adjusted so that the float 22 hovers at the tip of the lower arrow head 20L. As the filter begins to clog, the float rises, and when it reaches the upper arrowhead 20U, the filter should be serviced.

In the filter gauge construction illustrated herein for purposes of disclosure, the float tube has a diameter on the order of .255" at its bottom end, is 2⅜" long and tapers at the rate of .010" per inch to provide a diameter at its upper end of .300". The inlet orifice 24 is ⅛" diameter; the outlet orifice 25 is .052" diameter; and the bypass opening 30 is .110" diameter. The float ball 22 is a sphere of ¼" diameter and may be formed of expanded polystyrene. The weight of the ball may be varied to vary the range of the instrument for special applications. The tubular mounting stud has an outside diameter of .275".

It should be understood that the description of the preferred form of the invention is for the purpose of complying with section 112, title 35, of the U.S. Code and that the claims should be construed as broadly as prior art will permit.

We claim:

1. A pressure gauge for a gas distribution system having a filter separating a point substantially at atmospheric pressure and a point in a plenum chamber held at subatmospheric pressure, said pressure gauge comprising a transparent float tube having a tapered bore diverging from a small lower end to a larger upper end and having an inlet orifice at the lower end of said bore, an outlet orifice at the upper end of said bore and a bypass orifice adjacent said outlet orifice, a float in said bore, an outlet tube projecting from said float tube to provide an extension passage leading from said outlet orifice, means for mounting said float tube externally on an enclosing wall of said plenum chamber with said outlet tube projecting into said plenum chamber, with said inlet orifice exposed directly to atmosphere, and with said bypass orifice exposed directly to atmosphere, and a manually adjustable plug valve mounted in said float tube in an upper end portion of said bore located above said bypass and said outlet orifices, said valve being rotatable about the axis of said bore and including a rigid depending valve stem of substantially smaller horizontal cross section than the part of the bore in which it is located, said stem being shiftable upon rotation of said plug valve from a closed position wherein the valve stem spans and seals said bypass orifice to an open position wherein the valve stem is spaced from both said bypass orifice and said outlet orifice for varying only the flow resistance of said bypass orifice to regulate flow of atmosphere air through said bypass orifice to said outlet orifice and thereby to regulate float actuating flow through said bore.

2. A pressure gauge for a gas distribution system having a filter separating a point substantially at atmospheric pressure and a point in a plenum chamber held at subatmospheric pressure, said pressure gauge comprising a transparent float tube having a tapered bore diverging from a small lower end to a larger upper end and having an inlet orifice at the lower end of said bore, an outlet orifice at the upper end of said bore and a bypass orifice adjacent said outlet orifice, a float in said bore, an outlet tube projecting from said float tube to provide an extension passage leading from said outlet orifice, means for mounting said float tube externally on an enclosing wall of said plenum chamber with said outlet tube projecting into said plenum chamber, with said inlet orifice exposed directly to atmosphere, and with said bypass orifice exposed directly to atmosphere, and a manually adjustable plug valve mounted in said float tube in an upper end portion of said bore located above said bypass and said outlet orifices, said valve being rotatable about the axis of said bore and including a rigid depending valve stem of substantially smaller horizontal cross section than the part of the bore in which it is located, said stem being shiftable upon rotation of said plug valve from a closed position wherein the valve stem spans and seals said bypass orifice to an open position wherein the valve stem is spaced from both said bypass orifice and said outlet orifice for varying only the flow resistance of said bypass orifice to regulate flow of atmosphere air through said bypass orifice to said outlet orifice and thereby to regulate float actuating flow through said bore, said float tube having an arcuate slot bordering the upper end of the bore and providing abutment shoulders at its opposite ends, and said plug valve having a radially projecting stop projecting into said slot to engage said shoulders for confining said plug valve to a range of movement wherein said stem never restricts said outlet orifice.

References Cited in the file of this patent

UNITED STATES PATENTS

| | | |
|---|---|---|
| 1,832,725 | Mueller | Nov. 17, 1931 |
| 2,707,879 | Dwyer | May 10, 1955 |
| 2,778,223 | Kimbrell | Jan. 22, 1957 |

FOREIGN PATENTS

| | | |
|---|---|---|
| 377,299 | France | July 6, 1907 |